United States Patent
Ghosh et al.

(10) Patent No.: US 9,444,687 B2
(45) Date of Patent: Sep. 13, 2016

(54) SYSTEM AND METHOD FOR LOCALLY MANAGING NETWORK APPLIANCES IN A CLOSED AREA NETWORK VIA A GATEWAY DEVICE

(71) Applicant: Infosys Limited, Bangalore (IN)

(72) Inventors: Animikh Ghosh, Kolkata (IN); Ketan Patil, Bangalore (IN); Sunil Kumar Vuppala, Bangalore (IN)

(73) Assignee: Infosys Limited, Bangalore (IN)

(*) Notice: Subject to any disclaimer, the term of this patent is extended or adjusted under 35 U.S.C. 154(b) by 196 days.

(21) Appl. No.: 14/186,535

(22) Filed: Feb. 21, 2014

(65) Prior Publication Data

US 2014/0289387 A1    Sep. 25, 2014

(30) Foreign Application Priority Data

Mar. 20, 2013 (IN) .......................... 1206/CHE/2013

(51) Int. Cl.
  *G06F 15/173* (2006.01)
  *H04L 12/24* (2006.01)
  *H04L 12/28* (2006.01)

(52) U.S. Cl.
  CPC ....... *H04L 41/0893* (2013.01); *H04L 12/2827* (2013.01); *H04L 12/2834* (2013.01); *H04L 41/08* (2013.01)

(58) Field of Classification Search
  CPC ........... H04L 41/0213; H04L 41/0226; H04L 2012/285; H04L 2012/2847; H04L 12/2803; H04L 12/2807; H04L 12/2827; H04L 12/2829; H04L 12/283; H04L 41/08; H04L 41/0893; H04L 12/2834
  USPC ................ 709/202–205, 223–224, 227–229; 370/400–401
  See application file for complete search history.

(56) References Cited

U.S. PATENT DOCUMENTS

| 7,181,293 | B2* | 2/2007 | Rothman | H04L 12/2823 209/223.1 |
| 7,961,661 | B2 | 6/2011 | Hargrave et al. | |
| 8,086,757 | B2 | 12/2011 | Chang | |
| 8,868,721 | B2* | 10/2014 | Boggs | H04L 63/10 709/223 |
| 2007/0233285 | A1* | 10/2007 | Yamamoto | H04L 12/2803 700/28 |

(Continued)

OTHER PUBLICATIONS

Zigbee Alliance, retrieved at http://www.zigbee.org/ on Feb. 20, 2014.

(Continued)

*Primary Examiner* — Bharat N Barot
(74) *Attorney, Agent, or Firm* — LeClairRyan, a Professional Corporation

(57) ABSTRACT

A system, medium and method of managing, via a gateway device, to wirelessly communicate with a plurality of network appliances in a closed local area network is disclosed. A data message is received from a first network appliance configured to communicate data in association with a first application profile. The first application profile is retrieved from a locally stored application profile database upon being identified. A database is accessed at the gateway device containing policy information of the first network appliance and evaluated for one or more policy parameters. A first instruction command is generated at the gateway device based on the accessed policy information, wherein the instruction command conforms with the first application profile to instruct the first network appliance to perform a specified action. The instruction command is wirelessly transmitted from the gateway device to the first network appliance to cause it to perform a specified action.

18 Claims, 6 Drawing Sheets

(56) References Cited

U.S. PATENT DOCUMENTS

| | | | |
|---|---|---|---|
| 2009/0072991 A1* | 3/2009 | Hayashi | H04L 12/282 340/11.1 |
| 2010/0082174 A1* | 4/2010 | Weaver | H02J 3/14 700/295 |
| 2011/0022242 A1 | 1/2011 | Bukhin et al. | |
| 2011/0046799 A1* | 2/2011 | Imes | F24F 11/006 700/286 |
| 2011/0061014 A1* | 3/2011 | Frader-Thompson | G01D 4/002 715/771 |
| 2011/0063126 A1* | 3/2011 | Kennedy | G01D 4/002 340/870.02 |
| 2011/0314163 A1* | 12/2011 | Borins | H04W 4/005 709/227 |
| 2012/0310377 A1* | 12/2012 | Prentice | G06Q 50/06 700/36 |
| 2013/0262197 A1* | 10/2013 | Kaulgud | G05B 13/02 705/14.1 |
| 2014/0201321 A1* | 7/2014 | Donaghey | H04L 67/2823 709/217 |
| 2014/0236360 A1* | 8/2014 | Matsuoka | H04L 12/2825 700/276 |
| 2015/0006704 A1* | 1/2015 | Boggs | H04L 63/10 709/223 |
| 2015/0074259 A1* | 3/2015 | Ansari | H04L 12/2834 709/224 |

OTHER PUBLICATIONS

Digi Connect Port Zigbee Gateway, retrieved at http://www.digi.com/products/wireless-routers-gateways/gateways/connectportx2gateways#overview on Feb. 20, 2014.

* cited by examiner

SYSTEM AND METHOD FOR LOCALLY MANAGING NETWORK APPLIANCES IN A CLOSED AREA NETWORK VIA A GATEWAY DEVICE

RELATED APPLICATION

This application claims the benefit of Indian Patent Application Filing No. 1206/CHE/2013, filed Mar. 20, 2013, which is hereby incorporated by reference in its entirety.

FIELD

The present disclosure relates generally to a system and method for locally managing network appliances in a closed area network via a gateway device, and in particular, relates to a system and method for locally managing network devices utilizing low cost/lost power wireless machine to machine communication protocols.

BACKGROUND

Home and building automation is becoming even more popular with the support and use of personal area networks that allow local network enabled devices to wirelessly communicate with one another using low-power digital radios.

The Institute of Electronic and Electrical Engineers (IEEE) has ratified the IEEE 802.15.4 standard for mesh or personal area networks. ZigBee™ is one type of a standards certified suite of high level communication protocols using small, low-power digital radios based on the IEEE 802.15.4 standard. ZigBee™ specification is thus targeted for use with network enabled appliances and applications that require a low data rate, long battery life, as well as require secure networking. Some examples of such appliances and applications include: Home Entertainment and Control (e.g. Home automation, smart lighting, advanced temperature control, safety and security, movies and music); Wireless Sensor Networks; Industrial control; Embedded sensing; Medical data collection; Smoke and intruder warning; Building automation and the like.

ZigBee™ has a defined rate of 250 kbit/s, best suited for periodic or intermittent data or a single wireless signal transmission between network appliances and ZigBee™ enabled network gateway devices. Data transmission rates between ZigBee™ enabled network devices vary from 20 to 900 Kbps.

Any ZigBee™ compatible network appliance can be tasked with running on the ZigBee™ network. Such ZigBee™ appliances are designed to have radios that operate on an established country specific frequency bands (i.e. 868 MHz in Europe, 915 MHz in USA/Australia, 2.4 GHz in most other countries) as well as 60 KB-256 KB integrated flash memory.

However, the ZigBee™ suite was designed to have standardized application profiles that were specific to the type of market application in which the standard was to be used. For example, the ZigBee™ standard includes discreet application profiles for Home Automation; Smart Energy; Telecommunication Services; Health Care; RF4CE—Remote Control, etc. Each application profile has different set communication protocols within the PAN as well as gateway devices and servers, policy and decision making guidelines, memory usage, data rates and the like.

Typically, ZigBee™ network appliances communicate with one or more servers over a wide area network (i.e. Internet), wherein one or more gateway devices sitting on the edge of a Personal Area Network (PAN) relay the communications between the network appliances and the servers. However, considering there can be several different close range ZigBee™ network appliances, many of which utilize different application profiles in a particular PAN, the sheer handling of data as well as load balancing and other optimization processes must be handled by the servers.

Accordingly, the overall wide area network (between the PAN and the servers) can get bogged down with handling machine to machine communications, while also having to handle traditional network messaging.

What is needed is a system and method for locally managing network devices utilizing low cost/lost power wireless machine to machine communication protocols.

SUMMARY

In an aspect, a method of managing, via a gateway device configured to wireless communicate with a plurality of network appliances in a closed local area network is disclosed. The method comprises wirelessly receiving, at a gateway device in communication with a plurality of network appliances in a close local area network, a data message from a first network appliance configured to communicate data in association with a first application profile. The method includes retrieving, at the gateway device, the first application profile from a locally stored application profile database upon identifying the first network appliance from the received data message. The method includes accessing one or more databases at the gateway device containing policy information with regard to at least the first network appliance. The method includes evaluating the policy information in the one or more databases in association with one or more policy parameters at the gateway device. The method includes generating a first instruction command at the gateway device based on at least the accessed policy information, the first instruction command generated in conformance with the first application profile and configured to instruct the first network appliance to perform a specified action. The method includes wirelessly transmitting the first instruction command from the gateway device to at least the first network appliance, wherein the first network appliance performs the specified action in conjunction with the first instruction command.

In an aspect, a non-transitory processor readable medium having stored thereon instructions for managing a gateway device configured to wireless communicate with a plurality of network appliances in a closed local area network. The medium comprises processor executable code which, when executed by at least one processor of the gateway device, causes the processor to communicate with a plurality of network appliances in a close local area network, wherein a data message is received from a first network appliance at the gateway device. The data message is configured to communicate data in association with a first application profile of the first network appliance. The processor is configured to retrieve the first application profile from a locally stored application profile database upon identifying the first network appliance from the received data message. The processor is configured to access one or more databases containing policy information with regard to at least the first network appliance. The processor is configured to evaluate the policy information in the one or more databases in association with one or more policy parameters. The processor is configured to generate a first instruction command by the gateway device based on at least the accessed policy information, the first instruction command generated in conformance with the first application profile and configured to instruct the first network appliance to perform a specified action. The processor is configured to wirelessly transmit the first instruction command at least the first network appliance, wherein the first network appliance performs the specified action in conjunction with the first instruction command.

In an aspect, computing device comprises a network interface capable of communicating with one or more network appliances in a closed area network, a memory having stored thereon code embodying machine executable programmable instructions; and a processor configured to execute the stored programming instructions in the memory. The processor configured to communicate with the one or more network appliances in the close local area network, wherein a data message is received from a first network appliance at the gateway device, the data message configured to communicate data in association with a first application profile of the first network appliance. The processor configured to retrieve the first application profile from a locally stored application profile database upon identifying the first network appliance from the received data message. The processor configured to access one or more databases containing policy information with regard to at least the first network appliance. The processor configured to evaluate the policy information in the one or more databases in association with one or more policy parameters. The processor configured to generate a first instruction command by the gateway device based on at least the accessed policy information, the first instruction command generated in conformance with the first application profile and configured to instruct the first network appliance to perform a specified action. The processor configured to wirelessly transmit the first instruction command at least the first network appliance, wherein the first network appliance performs the specified action in conjunction with the first instruction command.

In one or more above aspects, a second instruction command is generated at the gateway device for a second network appliance in the closed area network. The second instruction command is generated based on at least the accessed policy information, the second instruction command generated in conformance with an application profile corresponding to the second network appliance. The second instruction command is then wirelessly transmitted from the gateway device to at least the second network appliance, wherein the second network appliance performs the specified action in conjunction with the second instruction command.

In one or more aspects, the data message from the first network appliance is associated with data taken from one or more sensors of the first network appliance.

In one or more aspects, the first instruction command is configured to cause one or more actuators of the first network appliances to operate.

In one or more aspects, a plurality of proposed operation schedules are generated, wherein each proposed operation schedule designates selected operation times for a set of a plurality of selected network appliances over a designated time duration. The plurality of generated proposed schedules are analyzed in association with one or more set operating constraints. An optimized schedule is identified from the proposed operation schedules, the optimized schedule having a lowest utility cost for operating the network appliances and satisfying the one or more set operating constraints.

In one or more aspects, preselected probability indexes are calculated for each network appliance for each time increment in the time duration, in which the probability indexes represent priority of operation of the network appliances. The probability indexes are then calculated for generating each proposed operating schedule.

DETAILED DESCRIPTION

Figure 1A:
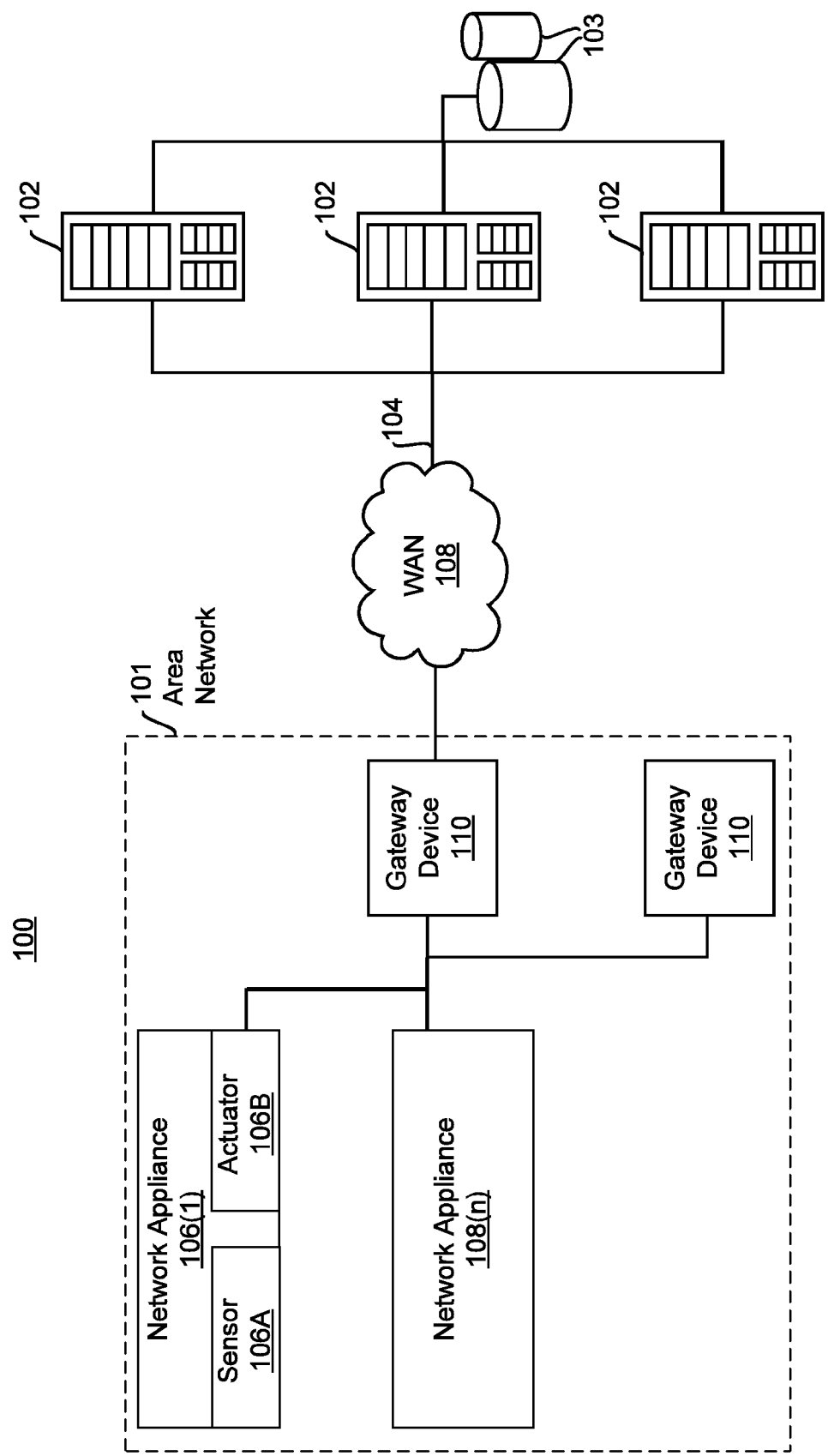
FIG. 1A illustrates a diagram of an example system environment that utilizes one or more network gateway devices in accordance with an aspect of the present disclosure.

FIG. 1A illustrates a diagram of an example network environment that utilizes one or more network gateway devices implemented for use with a closed area network in accordance with an aspect of the present disclosure. In particular, the environment 100 includes one or more servers 102, a closed area network (CAN) 101 including one or more network enabled appliances ("network appliance") 106(1)-106(n) along with one or more network enabled gateway devices 110 in communication with the network appliances 106 and the servers 102.

It should be noted that although three servers 102, two network appliances 106(1)-106(n) and two gateway devices 110 are shown in FIG. 1, any number (including only one) of these network devices can be used without being limiting to the present disclosure. It should also be noted, in terms of the present disclosure, that the naming of any network device, software or hardware component or other element in singular form (e.g. 'gateway device,' 'processor,' 'memory') does not limit it to the singular case and thus can be construed to be in the plural.

In an aspect, the servers 102 are connected to a local area network (LAN) 104 that is connected to a wide area network 108. In another aspect, the servers 102 are directly connected to the wide area network 108 for direct connection to one or more of the gateway devices 110 or for cloud based communications with the gateway devices 110. The servers 102 comprise one or more network devices or machines capable of operating one or more Web-based and/or non Web-based applications that may be accessed by other network devices (e.g. gateway devices, network appliances, other servers) in the network 100.

In an aspect, one or more servers 102 runs software to allow network control, operation and handling of any network appliance 106 (or sub-component thereof), any gateway device 110 and/or any other network device in the closed area network 101 utilizing the ZigBee™ standard or the like.

In an aspect, one or more servers 102 may be front end Web servers, application servers, and/or database servers which may handle Web page(s), image(s) of physical objects, user account information, and/or other tasks or resources. One or more servers 102 may comprise a cluster of a plurality of servers which are managed by a network traffic management device (e.g. firewall, load balancer, web accelerator), gateway device 110, router, hub and the like. In another aspect, the servers 102 implement a version of Microsoft® IIS servers, RADIUS servers and/or Apache® servers, and the like.

The closed area network (CAN) 101 is described herein as a local area network (LAN) or personal area network (PAN) in which one or more low cost/low power network appliances are able to wirelessly communicate in the CAN 101 in accordance with an aspect of the present disclosure. As shown in FIG. 1A, the CAN 101 includes one or more network appliances 106(1)-106(n) which wirelessly communicate with one or more gateway devices 110 (and the managing module 200) via the ZigBee™ standard. It should be noted that although the ZigBee™ suite and associated IEEE 802.15.4 standard are disclosed for use with the managing module 200 of the present disclosure, other low cost/low power closed area networks utilizing the same or other wireless communication standard can be utilized with the managing module.

Network appliances 106(1)-106(n) comprise network enabled devices capable of connecting to and communicating with other network appliances as well as gateway device(s) 110 and servers 102. As shown in FIG. 1A, one or more network appliance 106 includes at least one sensor 106A and at least one actuator 106B. However, it should be noted that the network appliance 106 may include only sensor(s) or only actuator(s).

In an aspect, the network appliance 106 can be one or more sensors 106A and/or one or more actuators 106B, wherein the primary function of the appliance 106, itself, is for sensing (e.g. motion detector) and/or actuation (e.g. door lock).

In another aspect, the network appliance 106 may be a combination of the sensor(s) 106A and/or actuator(s) 106B and a primary electronic device which performs a primary function other than sensing and/or actuation. The sensor(s) 106A and/or actuator(s) 106B may be external to the primary electronic device or are alternatively embedded in or integral with the primary electronic device. Non-limiting and non-exhausting examples of such primary electronic devices that may have sensor(s) 106A and/or actuator(s) 106B include, but are not limited to, lighting systems, HVAC systems, telecommunication devices, computer systems, computer peripheral systems, kiosks, GPS systems, switches, cameras, security systems and associated components, kitchen appliances, bathroom appliances, bedroom appliances, living room appliances, laundry facilities, water/gas heaters, audio and/or video systems, video game systems, local network routers, power outlets, power utility meters, gas and water regulators, vehicles and vehicle components, industrial machinery and any other electronic device that can be operated remotely in residential, commercial or industrial settings.

In an aspect, the sensor 106A provides measurement or monitoring data to the gateway device 110 in accordance with its associated application profile. Some example of sensors 106A include, but are not limited to, motion detectors, accelerometers, infrared sensors, temperature sensors, pressure sensors, radiation sensors, natural gas sensors, smoke detectors, carbon monoxide sensors, door sensors, window sensors, and the like.

Additionally, the actuator 106B receives commands or instructions from the gateway device 110, wherein the actuator 106B performs the action in conformance with the received command/instruction. Some examples of actuators 106B include, but are not limited to, switches, locks, temperature valves, water valves, curtains, gas and water valves, utility meters, relays, motion sensors, alarms, temperature sensors. thermostats, VOC sensors and switches or any other hardware or software component which causes a device to perform a certain action. For example, sensor 106A may provide monitoring data to the gateway device 110 that a person has entered a specific room, wherein the gateway device 110 will instruct actuator 106B to turn on a light in that room.

Network 108 comprises a publicly accessible network, such as the Internet, which handles communication between the network appliances 106(1)-106(n) and the servers 102, via the gateway device(s) 110. However, it is contemplated that the network 108 may comprise other types of private and public networks. Communications between the gateway device 110 and the servers 102 take place over the network 108 according to standard network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies. LAN 104 may comprise one or more private and public networks which provide secured access to the servers 102. It should be noted that the LAN 104 is not necessary to the operation of the system described herein.

Figure 1B:
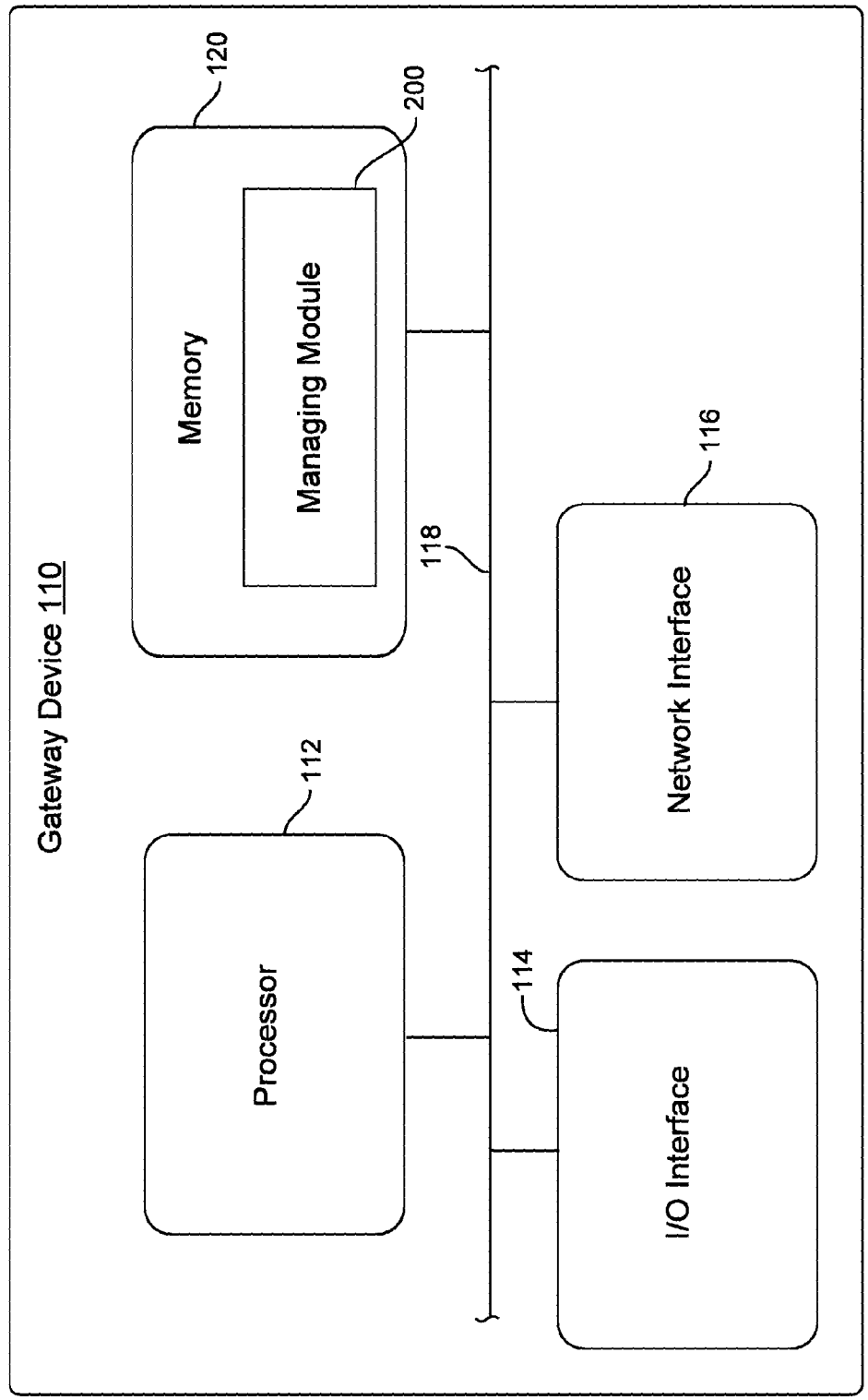
FIG. 1B illustrates a block diagram of a network enabled gateway device implementing a managing module in accordance with an aspect of the present disclosure.

FIG. 1B illustrates a block diagram of a gateway device shown in FIG. 1A in accordance with an aspect of the present disclosure. The gateway device 110 includes one or more processors 112, one or more device I/O interfaces 114, one or more network interfaces 116 and one or more memories 120, all of which are coupled together by one or more buses 118. As will be discussed in more detail below, the gateway device 110 includes a managing module 200 stored in the memory 120, although the module 200 may be stored in other memory external to the device 110. It should be noted that the gateway device 110 can include other types and numbers of components and is not limited to the configuration shown in FIG. 1B.

Device processor 112 comprises one or more microprocessors configured to execute computer/machine readable and executable instructions stored in the respective local device memory 120 or in a remote device memory (not shown). Such instructions are implemented by the processor 112 to perform one or more functions of the managing module 200, as described in more detail below. It is understood that the processor 112 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like.

Device I/O interfaces 114 comprise one or more user input and output device interface mechanisms local to the gateway device 110 to allow communications between the user or network administrator and the gateway device 110. Such communications include, but are not limited to, communicating user input data and commands (e.g. configuration, adjustment instructions, general setup) to the device 110 and receiving output information from the device 110 regarding general and specific information of the CAN 101, one or more network appliances 106(1)-106(n) or the gateway device 110 itself. In an aspect, the interface 114 is located on the device 110, itself, wherein the user is able to interact with the gateway device 110 via the local interface. In another aspect, the interface 114 is displayed on a wired or wirelessly connected computer (e.g. mobile phone, laptop, tablet), whereby the user is able to interact with the gateway device 110 through the external computer using the interface 114.

Network interface 116 comprises one or more mechanisms that enable the gateway device 110 to communicate with the network appliances 106(1)-106(n) in the CAN 101 as well as the servers 102. The network interface 116 is configured to handle transmission and receipt of data packets specific to the different application profiles and protocols of the network appliances 106(1)-106(n) in the CAN 106. Similarly, the network interface 116 is configured to handle transmission and receipt of data packets with the servers 102 in conformance with appropriate network protocols (e.g. TCP/IP, UDP). Network interface 116 is sometimes referred to as a transceiver, transceiving device, or network interface card (NIC).

In an example where the network device includes more than one device processor 112 (or a processor 112 has more than one core), each processor 112 (and/or core) may use the same single network interface 116 or a plurality of network interfaces 116 to communicate with other network devices. Further, the network interface 116 may include one or more physical ports, such as Ethernet ports, to couple its respective device with other network devices in the system 100. Moreover, the network interface 116 may include certain physical ports dedicated to receiving and/or transmitting certain types of network data, such as device management related data for configuring the respective device, and the like.

Bus 118 comprises one or more internal device component communication buses, links, bridges and supporting components, such as bus controllers and/or arbiters. The bus 118 enables the various components of the device 110, such as the processor 112, I/O interface 114, network interface 116, manager module 200 and device memory 120 to communicate with one another. However, it is contemplated that the bus 118 may enable one or more components of its respective network device to communicate with components in other devices as well. Example buses 118 include Hyper-Transport, PCI, PCI Express, InfiniBand, USB, Firewire, Serial ATA (SATA), SCSI, IDE and AGP buses. However, it is contemplated that other types and numbers of buses 118 may be used, whereby the particular types and arrangement of buses 118 will depend on the particular configuration of the gateway device 110 which houses the bus 118.

Device memory 120 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 112. Such stored instructions allow the processor to perform actions, including implementing an operating system for controlling the general operation of the gateway device 110, and in particular, ensuring smooth operation of the managing module 200, to perform one or more portions of the novel processes described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store desired information. Such desired information includes data and/or computer/machine-executable instructions and which can be accessed by the gateway device 110. It should be noted that although the memory 120 is shown as separate from the processor 112, it is contemplated that the processor 112 may have an integrated memory, such as a flash memory, instead of (or in addition to) memory 120.

Figure 2A:
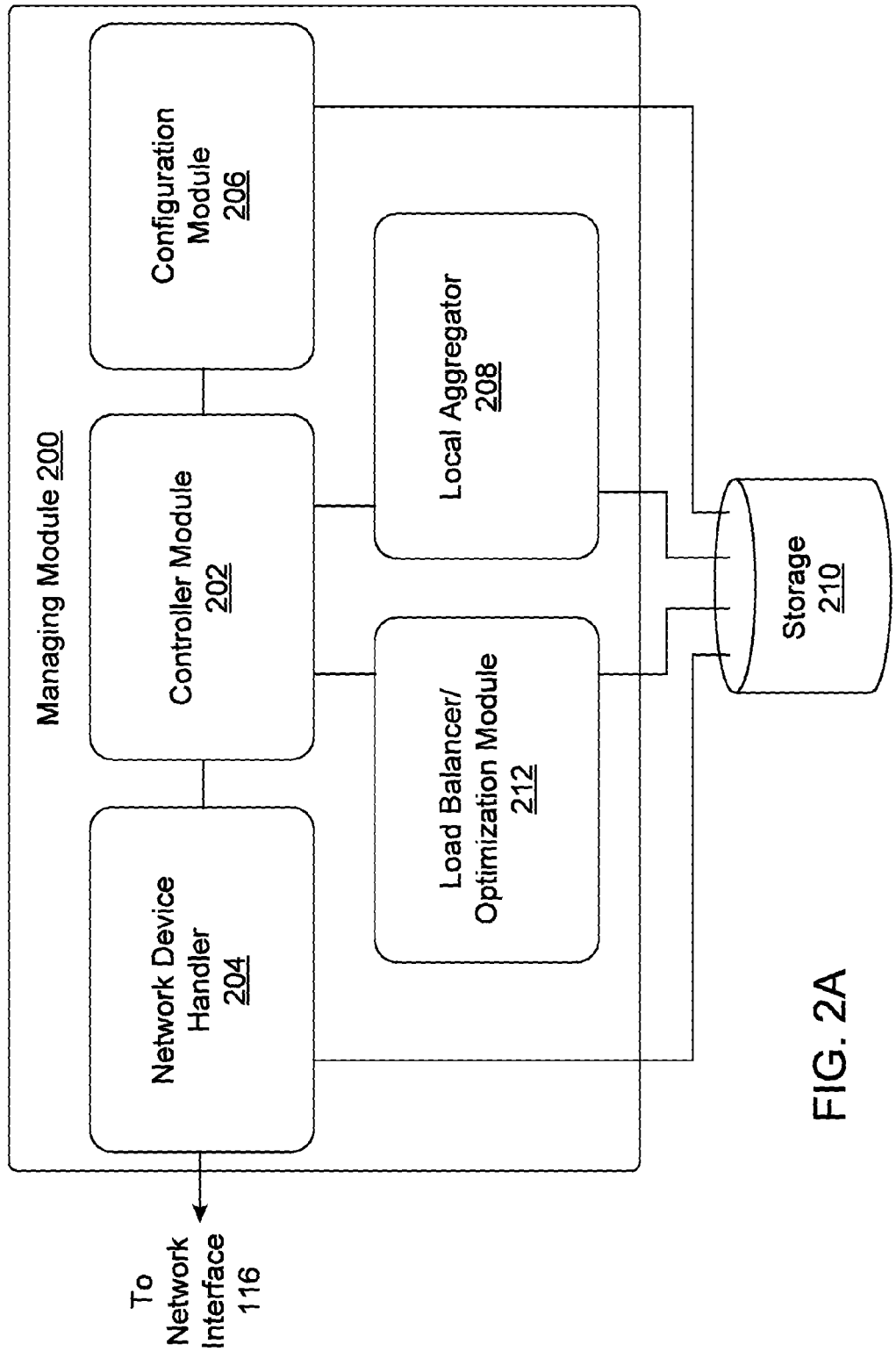
FIG. 2A illustrates a block diagram of the components of the managing module in accordance with an aspect of the present disclosure.

FIG. 2A illustrates a block diagram of an example managing module of the gateway module in accordance with an aspect of the present disclosure. In general, the managing module 200 is a software based solution that is stored in the memory 120 and is loaded onto the gateway device 110, either locally via the I/O interface 114, or remotely pushed by one or more servers 102. Generally, the managing module 200 manages incoming and outgoing data message with respect to the network appliances 106(1)-106(n) in the CAN 101 and servers 102 in accordance with various configuration parameters. The managing module 200 is configured to be able to locally make decisions that affect the operation of the network appliances 106(1)-106(n) as well as the overall CAN 101, thereby relieving the server(s) 102 from having to perform those functions.

For example, the managing module 200 can make smart decisions to control, in real-time, energy consumption of one or more network appliances 106(1)-106(n) in the CAN 106 as well as perform load balancing and various other smart intelligent activities to optimize operation of the PAN, as well as selectively communicate with the server(s) 102. For example, the managing module 200 maybe configured in a manner such that the gateway device 200 will notify the server 102 for one or more specific activities where the server 102 doesn't want the gateway device 200 to make a particular decision locally for those specific activities.

As shown in FIG. 2A, the managing module 200 includes a controller module 202, a network device handler 204, a configuration module 206, a local aggregator module 208, a local storage 210 and an optimization module 212. It should be noted that additional/fewer/different modules may be utilized in the managing module 200 and the example shown in FIG. 2A is only exemplary and thus not limiting.

The controller module (referred to also as "controller") 202 performs general handling, managing and organizing of functions performed by the managing module 200. In an aspect, the controller module 202 coordinates and communicates with the various other modules or subcomponents. Accordingly, the controller module 202 operates in an orchestrating fashion by communicating with the various other modules to ensure effective operation of the managing module 200.

The network device handler module 204 operates with the controller 202 and communicates with the network interface 116 (FIG. 1B) of the gateway device 110 to allow seamless communication with the network appliances 106(1)-106(n) as well as server(s) 102. More details of the network device handler module 204 are described in relation to FIG. 2B.

As shown in FIG. 2A, the configuration module 206 of the managing module 200 is configured to access various configuration and policy parameters stored in storage 210. In particular, the configuration module 206 may access configuration and/or policy parameter instructions to allow the managing module 200 to selectively make decisions that affect operations of one or more network appliances 106(1)-106(n) in the CAN 101 and/or handle instructed communications with the server 102. More details of the configuration module 206 are described in relation to FIG. 2C.

As shown in FIG. 2A, the managing module 200 includes a local aggregator module 208 configured to aggregate and store incoming data from the network appliances 106(1)-106(n) and/or server 102 for a designated amount of time in conformance with configuration data. The storage 210 may have a limited amount of space to store data received from other network devices. As a result, received data may be stored in the storage 210 for a limited and set amount of time before being sent to a server 102 based on a policy configuration. The aggregator also supplies the input to the load balancer and optimization module 212.

As shown in FIG. 2A, the managing module 200 includes an optimization module 212 configured to perform load balancing processes as well as other optimization processes to achieve efficient operation of the network appliances 106(1)-106(n) within the CAN 101. In an aspect, the optimization module 212 may be utilized to minimize overall energy costs of the appliances in the CAN 101, as will be described in more detail below.

Figure 2B:
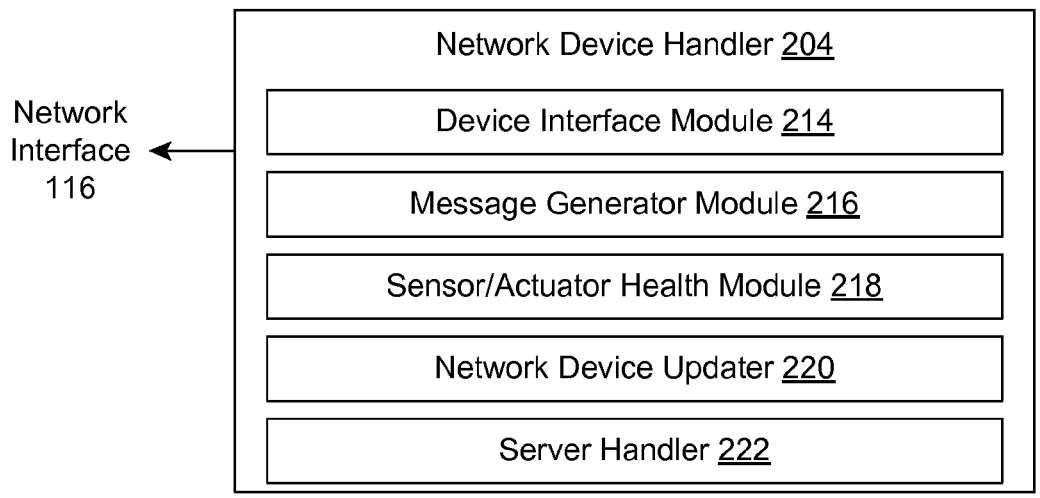
FIG. 2B illustrates a block diagram of a network device handler component of the managing module in accordance with an aspect of the present disclosure.

FIG. 2B illustrates a block diagram of an example network device handler module in accordance with an aspect of the present disclosure. As discussed above, the network device handler module 204 operates with the network interface 116 (FIG. 1B) to allow seamless communication of the gateway device 110 with network appliances 106(1)-106(n) as well as server(s) 102. Referring now to FIG. 2B, the network device handler 204 may one or more sub-modules or sub-components. In an aspect, these sub modules include a device interface module 214, a message generator module 216, a sensor/actuator health module 218, a network device updater module 220 and a server handler module 222. It should be noted that the sub-modules in FIG. 2B are exemplary only and need not be incorporated in the network device handler 204, but can be implemented in any other module (including just the managing module 200).

The device interface module 214, in an aspect, is configured to analyze data messages received at the gateway device 110 from one or more transmitting network appliances 106(1)-106(n). As mentioned above, various network appliances 106(1)-106(n) which utilize the ZigBee™ suite communicate in association with different application profiles which can widely vary from one another. In other words, one type of network appliance 106 may communicate and operate in accordance with one type of application profile whereas another type of network appliance 106 may communicate and operate in accordance with another type of application profile. In particular, two different application profiles may require that the data packets be set up differently and contain different content information. In other words, a particular network appliance may speak a different communication language than another network appliance which uses a different application profile.

Accordingly, the gateway device 110 is designed to allow it to communicate with each network appliance by 'speaking each appliance's language." In particular, the managing module 200 is able to process incoming packets and generate outgoing data packets with each network appliance in conformance with that appliance's respective application profile. The device interface module 214 enables the managing module 200 to do this with any network appliance 106(1)-106(n) in the CAN 101 irrespective of the application profile.

The device interface module 214 is configured to identify the transmitting network appliance 106 which sent the corresponding data message. In particular, the interface module 214 analyzes information of the data message, such as header information and/or actual content data in the body of the data message. The interface module 214 may determine such information including, but not limited to, whether the transmitting network appliance 106 is a stand alone device or is part of a combined network appliance (described above). The interface module 214 may determine whether the network appliance is a sensor 106A and/or an actuator 106B. The interface module 214 may determine the specific application protocol which is to be used when communicating with the transmitting network appliance 106, as well as determining the network address of the transmitting appliance 106 and other information identifying specific policy and/or appliance configuration information stored in the configuration module 206, as well as the location of the network appliance 106 in the CAN 101 and the like. The interface module 214 also functions as a translator to communicate with the various hetergeneous network appliances in the CAN 101.

Once the network appliance 106 is identified, the managing module 210 can access the storage and retrieve the application profile that corresponds to that network appliance 106. The managing module 210 will then be able to apply that appliance's 106 application profile to effectively process the data message and communicate with that appliance 106.

As shown in FIG. 2B, the network device handler 204 includes a message generator module 216 which utilizes the application profile information for the network appliance 106. The message generator module 216 is configured to operate with the controller 202 and generate data packets to send to the network appliance 106 in conformance with its application profile.

As shown in FIG. 2B, the network device handler includes a sensor/actuator health check module 218. The health check module 218 operates with the controller 202 and utilizes policy parameter information to perform routine check up processes for identified network appliances 106. In an aspect, the health check module 218 utilizes scheduling information from the configuration module 206 to ping the identified network appliances 106 and update the server 102 if no response is received from the appliance(s) 106 within a set amount of time.

As shown in FIG. 2B, the network device handler 204 may include a network appliance updater module 220 in an aspect. It should be noted that although the network appliance updater module 220 is shown in a separate block, it is contemplated that the updater module 220 can be incorporated into one or more other modules. The updater module 220 works in tandem with the health check module 218 and keeps track of the network appliances 106 which do not respond to the ping(s) sent from the health check module 218. The updater module 220 may store such information for immediate or eventual transmission to the server 102. In an aspect, the updater module 220 may keep track of the network appliances which are currently on-line and responding to the pings. Also if a new network appliance 106(1)-106(n) joins the CAN 101, the updater module 220 may authenticate the new appliance and communicate start up information retrieved from the appliance configuration module 228 (FIG. 2C).

As shown in FIG. 2B, the network device interface 214 may include a server handler module 222 in accordance with an aspect. The server handler 222 can handle information concerning the flexibility in the transmission protocols that the servers 102 use to communicate. This is advantageous if a particular network appliance's application profile has a transmission protocol that is compliant with that of the server 102, the server handler module 222 will indicate such so that the managing module 200 will not need to convert any data received from that particular network appliance 106. Some examples of such protocols that the server handler module 222 can inform to the managing module 200 include, but are not limited to, XML, ASCII, binary etc. In an aspect, the server handler 222 may provide information associated with one or more preferred mediums (e.g. Ethernet, WiFi, mobile network) over which communications are to be sent from the gateway device 110 to the server 102. In another example, if the gateway device 110 is to transmit a data message to a particular server 102 which is an IPv6 server, the interface module 214 will correspondingly instruct the network interface 116 to configure the headers of any generated outgoing data packets with IPv6.

Figure 2C:
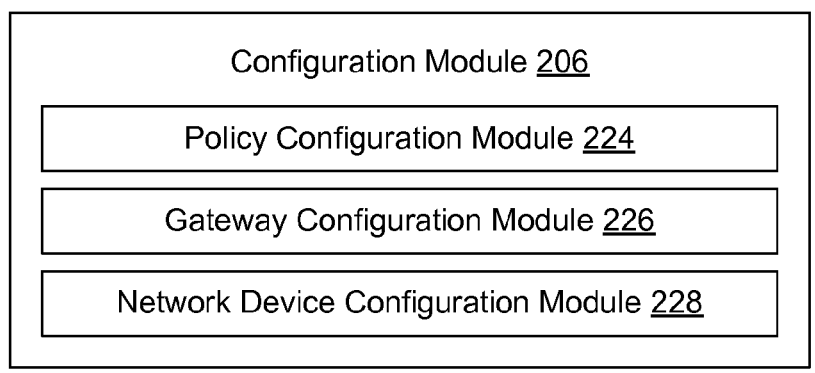
FIG. 2C illustrates a block diagram of a configuration module component of the managing module in accordance with an aspect of the present disclosure.

FIG. 2C illustrates a block diagram of an example configuration module in accordance with an aspect of the present disclosure. As shown in FIG. 2C, the configuration module 206 includes a policy configuration module 224, a gateway device configuration module 226, and a network appliance configuration module 228.

In general, the policy configuration module 224 locally stores and locally handles policy based instructions and/or localized rules which are provided by the server 102. This is advantageous as the managing module 200 can execute assess and execute policies that are locally stored without troubling the servers 102 or enterprise dashboard.

In an aspect, the policy configurations handled by the policy configuration module 224 can include any general, time based, usage based and/or budget based policies that the managing module 200 locally executes to control one or more network appliances 106(1)-106(n) based on the policies and/or data received from the network appliances 106(1)-106(n).

An example of a general policy would be for the managing module 200 to turn off one or more lights in a room if sensor data indicates that no one is in that room. An example of a time based policy would instruct the managing module 200 to turn off one or more identified network appliances 106(1)-106(n) after 6:00 pm. Another time based policy may instruct the managing module 200 to turn on one or more identified network appliances 106(1)-106(n) at 9:00 am.

One usage based policy example may instruct the managing module 200 of the gateway device 110 turn off one or more identified network appliances if one appliance or a group of appliance(s) consumes more than 1 kWh in one day.

The gateway configuration module 226 contains instructions and configuration data that are specific to the gateway device 110 and the managing module 200. In particular, the gateway configuration data is specific to the operation of the gateway device 110 and the managing module 200 such that the gateway device 110 (and module 200) can effectively and efficiently carry out its activities with respect to the network appliances 106(1)-106(n) and the CAN 101.

In an aspect, the gateway configuration data may contain a list that identifies the network appliance(s) 106(1)-106(n). In an aspect, the list can be configured from the server 102 on the gateway device 110 via XML commands without disturbing gateway running functionality. In an aspect, the gateway configuration data may identify new network appliances that are added to the CAN 101 along with instructions to the gateway device 110 regarding authentication steps to be taken by the gateway device 110 for the newly added appliance.

In an aspect, the gateway configuration data may instruct the managing module 200 regarding established priority or order instructions with regard actions that the managing module 200 must take when handling more than one network appliance 106(1)-106(n). For example, the priority/order instructions may indicate an order of network appliances 106(1)-106(n) which the managing module 200 is to turn off if there is budget threshold breach.

The network appliance configuration module 228 contains instructions and configuration data that are specific to the network appliances 106(1)-106(n) in the CAN 101. The configuration data handled by the network appliance configuration module 228 is used to instruct the managing module 200 on daily energy budgets allotted to those network appliances 106(1)-106(n) and operational thresholds that the network appliances 106(1)-106(n) cannot exceed, priority lists of the associated network appliances, operating status of network appliances (e.g. smart plugs) and the like.

Another example is a gateway hourly energy budget, wherein running time is a priority of every network appliance 106(1)-106(n) that does not harm the operation of the business. For example there can be one or more rules that the gateway device 110 executes in conformance with, irrespective of load balance or budgeting purposes. For instance, the gateway device 110 may have a rule that requires that one or more network enabled hot water or geyser devices be turned on by the gateway device 110 from morning 8:00 am until 5:00 pm everyday.

Figure 3:
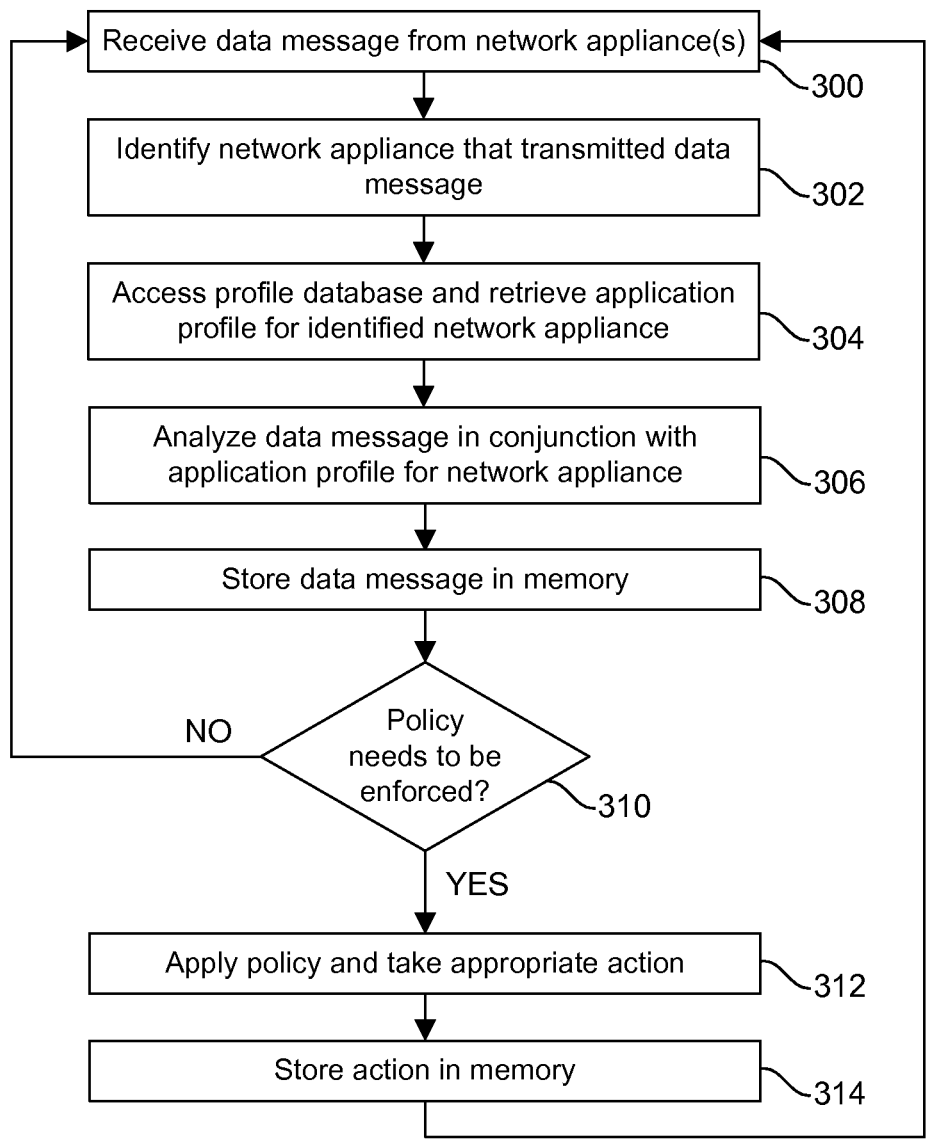
FIG. 3 illustrates a flow chart describing the process for managing a plurality of network appliances in a closed area network in accordance with an aspect of the present disclosure.

FIG. 3 illustrates a flow chart describing the process for managing a plurality of network appliances in a closed area network in accordance with an aspect of the present disclosure. In particular, as shown in FIG. 3, the process begins when the managing module 200 receives a data message from a network appliance 106(1)-106(n) (Block 300). The managing module 200 identifies the network appliance 106(1)-106(n) that transmitted the data message (Block 302).

The managing module 200 thereafter accesses one or more databases and retrieves application profile information for the identified network appliance 106(1)-106(n) (Block 304).

Utilizing the application profile information for the network appliance 106(1)-106(n), the managing module 200 is able to analyze the data message (Block 306). The managing module 200 thereafter stores the data message in a local aggregator or other memory (Block 308).

The managing module 200 also accesses the configuration module 206 and determines whether any instructions or rules are to be executed by the managing module 200 in accordance with one or more policies directed to the gateway device 110, network appliance 106(1)-106(n), or other matter (Block 310). If not, the process repeats back to Block 300.

If so, the managing module 200 executes one or more actions in conformance with the one or more policies (Block 312). The action is then stored by the managing module 200 and the process repeats back to Block 300.

Figure 4:
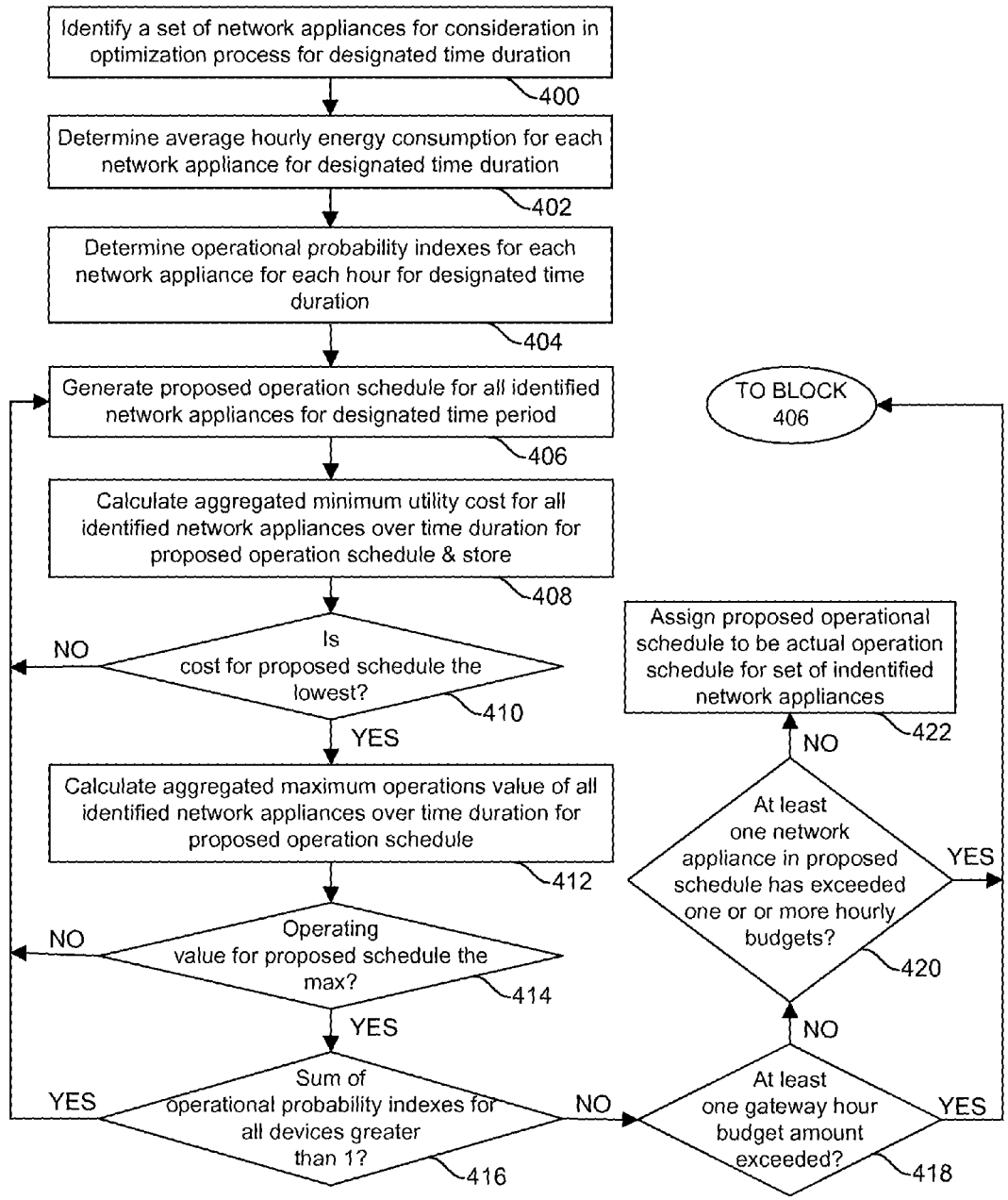
FIG. 4 illustrates a flow chart representing at least a portion of a process performed by an optimization module of the gateway device to determine an optimized operational schedule in accordance with an aspect of the present disclosure.

FIG. 4 illustrates a flow chart representing at least a portion of a process performed by the optimization module 212 to determine an optimized operational schedule in accordance with an aspect of the present disclosure. The techniques utilized by the optimization module 212 is advantageous in minimizing consumption of power and reducing associated utility costs while efficiently maximizing the operational time of the network appliances 106(1)-106(n) handled by the gateway device 210 in the CAN 101. Many power providers apply a varying price per kW-hour, whereby the price may change during peak hours as well as during non-peak hours.

In general to the process described below, the optimization module 212 of the gateway device 110 may be configured to iteratively generate several proposed operational schedules for a set number of network appliances handled by the gateway device 110. As will be discussed in more detail below, the optimization module 212 applies various algorithms to energy and utility cost data and analyzes the results in light of one or more set parameter boundaries to select an optimized operational schedule that maximizes the operation of the network appliances 106(1)-106(n) while minimizing the overall utility cost of operating the appliances 106(1)-106(n). The optimization module 212 is configured to receive As shown in Block 400 in FIG. 4, the optimization module 212 first identifies the number of network appliances "d" 106(1)-106(n) which the gateway device 110 that are to be considered in the optimization process. The optimization device 212 can consider any number of network appliances "d" 106(1)-106(n) greater than 1.

The optimization module 212 also determines the average amount of utility power that each network appliance in the set consumes ("h") for a number of time increments over the designated time duration (Block 402). In an aspect, the time duration may be designated to be 24 hours, although shorter or longer time durations are contemplated.

The designated time increments considered by the optimization module 212 are in conformance with the time increments that are in the proposed operation schedules. For the example procedure in FIG. 4, the optimization module 212 considers each time increment to one hour wherein the average energy consumptions are considered per hour over the time duration. It should be however, that other time increments can be contemplated (e.g. 5, 15, 30 minutes increments, 2 hour increments) by the optimization module 212, in an aspect.

The optimization module 212 also accesses stored data to determine assigned priority values or probability indexes for each identified network appliance, per time increments over the time duration (Block 404). In particular, the priority value for a corresponding network appliance reflects the probability that the network appliance would be operating during the associated time increment in the event that a monetary or energy consumption threshold had been exceeded. For instance, network appliances that are essential or perform critical functions (e.g. security alarms, HVAC) will be assigned higher priority values whereas less important network appliances will be given lower priority values.

In an example, the essential network appliances may be assigned a priority value of 0.9 whereas non-essential network appliances may be given a priority value of 0.2 for a designated time increment. It should be noted that the priority value for a particular network appliance may change among time increments. For instance, a network appliance performing air conditioning or heating functions may have a greater priority value during business hours and a lower priority value during non business hours. It should be noted that a network appliance can be assigned a priority value of 0 or 1 for a corresponding time increment.

In an aspect, the optimization module 212 generates one or more proposed operation schedules for the set of network appliances that are considered for optimization (Block 406). It should be noted that proposed operation schedules are iteratively and simultaneously generated and processed. In particular, the proposed operation schedule takes into account the operating statuses of the network appliances in the set with respect to each time increment over the designated time duration. In an aspect, the proposed operation schedule is configured as a two dimensional matrix, wherein each network appliance "d" in the set D is given an operational status of ON or OFF for each time increment. In an aspect, an operational status of ON is given a value of "1" whereas an operational status of OFF for a particular network appliance is given a value of "0". It should be noted that the generated matrix is the solution output. If the below equations 1 to 5 are fed to a linear programming solver, then based on objectives mentioned in equation 1 and 2 below and constraints mentioned in equation 3, 4, 5 the LP solver will output this two dimensional matrix.

For the generated proposed operation schedule, the optimization module 212 calculates an aggregated minimum utility cost for the set of network appliances over the designated time duration (Block 408). In an aspect, the optimization module 212 utilizes an algorithm represented in Equation 1 to calculate the aggregated minimum utility cost for the proposed operation schedule.

$$\text{Min(Bill)} = \sum_{t=1}^{24} \sum_{i=1}^{no\ of\ dev} d_i h_i s_{i,t} * C_t \qquad (1)$$

Where $C_t$ is the cost per kW-hour charged by the utility company at time increment t. As shown in Equation 1, the optimization module 212 calculates the product of the average power consumption "$h_i$" for a network appliance "$d_i$" with the cost of power "$C_t$" at time increment t. As described above, the operating status "$S_{i,t}$" for a particular network appliance will have a value of 1 if the network appliance is operating at time increment t. Accordingly, if the network appliance is not operating at a particular time increment, the product will have a value of "0".

Accordingly, the optimization module 212 sums the products for each network appliance over each time increment for the entire designated time duration to calculate the minimum utility cost for the proposed operation schedule.

The optimization module 212 thereafter determines whether the calculated minimum utility cost is the lowest among other stored aggregated utility cost results corresponding to other proposed operation schedules generated by the optimization module 212 (Block 410). If the optimization module 212 determines that the aggregated minimum utility cost for the proposed operation schedule does not have the lowest monetary amount, the optimization module 212 discards the proposed operating schedule and generates another proposed operating schedule (Block 406). The new generated schedule will have different operating status assigned to the network appliances in the set.

For the generated proposed operation schedule, the optimization module 212 also calculates an aggregated maximum operating value for the set of network appliances over the designated time duration (Block 412). In an aspect, the optimization module 212 utilizes an algorithm represented in Equation (2) in determining the maximum operating time for the network appliances for each time increment over the time duration:

$$\text{Max(run time)} = \sum_{t=1}^{24} \sum_{i=1}^{no\ of\ dev} S_{i,t} \quad (2)$$

In particular, the optimization module 212 sums up the operating status values (i.e. 0 or 1) for each network appliance at each time increment over the time duration to calculate an aggregated maximum operating value for the network appliances of the proposed schedule. The optimization module 212 thereafter determines whether the calculated maximum operating value is of the greatest value among other stored aggregated maximum operating values for other proposed operation schedules generated by the optimization module 212 (Block 414). If the optimization module 212 determines that the aggregated maximum operating value for the proposed operation schedule is not the greatest value, the optimization module 212 discards the proposed operating schedule and generates another proposed operating schedule (Block 406). The new generated schedule will have different operating status assigned to the network appliances in the set.

In contrast, if the optimization module 212 determines that the aggregated maximum operating value for the proposed operation schedule is the greatest value, the process proceeds to Block 416. In particular to Block 416, the optimization module 212 determines whether the sum of the priority values assigned to the network appliances in the proposed operation schedule, at any particular time increment, is greater than a predetermined priority threshold value, as shown in Equation (3). In an aspect, the priority threshold value is "1", although other values are contemplated.

$$\sum_{i=1}^{no\ of\ dev.} \text{Prob.}(d_i) \leq 1 \quad (3)$$

If the optimization module 212 determines that the sum of the priority values for the network appliances exceeds the priority threshold value, at one or more time increments, the optimization module 212 discards the proposed operating schedule and generates another proposed operating schedule (Block 406). The new generated schedule will have different operating status assigned to the network appliances in the set.

In contrast, the optimization module 212 determines whether the proposed schedule has an associated utility cost which violates a preestablished monetary budget of the gateway device 110 at one or more time increments (Block 418), as represented in Equation (4).

$$\sum_{i=1}^{no\ of\ dev} S_{i,t} * C_t \leq dev \text{ hourly budget}, \forall\ t \in 1, 2, \ldots 24 \quad (4)$$

If the optimization module 212 determines that the pre-established monetary budget of the gateway device 110 is exceeded by the proposed schedule at one or more time increments, the optimization module 212 discards the proposed operating schedule and generates another proposed operating schedule (Block 406). The new generated schedule will have different operating status assigned to the network appliances in the set.

However, if the gateway device's 110 energy budget and/or utility cost budget is not exceeded at any time increment for the proposed schedule, the optimization device 210 determines if the energy and/or utility budget of any of the network appliances 106 in the set will be exceeded during at least one time increment for the proposed schedule (Block 420).

In particular to an aspect, the optimization module 212 utilizes an algorithm, such as in Equation (5), to calculate the budget constraints assigned to each network appliance:

$$\sum_{t=1}^{24} S_{i,t} * C_t \leq dev \text{ daily budget}, \forall\ d_i \in D \quad (5)$$

If the optimization module 212 determines that the pre-established monetary and/or energy budget for any network appliance 106 is exceeded by the proposed schedule at one or more time increments, the optimization module 212 discards the proposed operating schedule and generates another proposed operating schedule (Block 406). The new generated schedule will have different operating statuses assigned to the network appliances in the set.

On the other hand, the optimization module 212 will consider the proposed schedule to be an optimized schedule which is then stored in a memory (Block 422). The gateway device 110 is able to process and implement the newly considered optimized schedule to operate the network appliances in conformance with the new schedule. In an aspect, the gateway device 110 communicates such data to the one or more server devices 102. In an aspect, the optimization device 212 may periodically execute the process described in FIG. 4 to adjust an existing optimized schedule or implement a new optimized schedule.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method of managing network appliances, the method comprising:
   wirelessly receiving, by a gateway device in communication with a plurality of network appliances in a closed area network, first and second data messages from first and second ones of the network appliances, respectively;

analyzing, by the gateway device, the received first and second data messages to determine first and second standard application profiles and retrieving the first and second standard application profiles from a locally stored application profile database, wherein the first standard application profile is not the same as the second standard application profile;

accessing, by the gateway device, one or more databases that comprise policy information associated with at least one of the first or second ones of the network appliances;

evaluating, by the gateway device, the policy information in the one or more databases in association with one or more policy parameters;

generating, by the gateway device, a first instruction command based on at least the policy information, the first instruction command generated in conformance with one of the first or second standard application profiles and configured to instruct the at least one of the first or second ones of the network appliances to perform a specified action; and wirelessly transmitting, by the gateway device, the first instruction command to the at least one of the first or second ones of the network appliances to cause the at least one of the first or second ones of the network appliances to perform the specified action.

2. The method of claim 1, wherein the data message from the first or second ones of the network appliances is associated with data obtained from one or more sensors of the first or second ones of the network appliances.

3. The method of claim 1, wherein the first instruction command is configured to cause one or more actuators of the first or second ones of the network appliances to operate.

4. The method of claim 1, wherein the first or second data message includes sensor data, the policy information includes one or more triggering operating parameters with respect to the sensor data, and the method further comprises:

communicating, by the gateway device, data to one or more server devices, wherein the communication data is processed by the one or more server devices.

5. The method of claim 1, further comprising:

generating, by the gateway device, a plurality of proposed operation schedules, each proposed operation schedule designating selected operation times for plurality of selected ones of the network appliances over a designated time duration;

analyzing, by the gateway device, the plurality of generated proposed schedules in association with one or more set operating constraints; and identifying, by the gateway device, an optimized schedule from the proposed operation schedules, the optimized schedule having a lowest utility cost for operating the selected ones of the network appliances and satisfying the one or more set operating constraints.

6. The method of claim 5, further comprising:

generating, by the gateway device, preselected probability indexes for each of the selected ones of the network appliances for each time increment in the time duration, the probability indexes representative of a likelihood that the selected ones of the network appliances would be operational in each time increment in the time duration and corresponding to a priority of operation of the selected ones of the network appliances; and applying, by the gateway device, the probability indexes in generating each of the proposed operating schedules.

7. A non-transitory processor readable medium having stored thereon instructions for managing network appliances, the medium comprising processor executable code which, when executed by at least one processor, causes the processor to:

wirelessly receive first and second data messages from first and second ones of a plurality of network appliances, respectively, in a closed area network;

analyze the received first and second data messages to determine first and second standard application profiles and retrieve the first and second standard application profiles from a locally stored application profile database, wherein the first standard application profile is not the same as the second standard application profile;

access one or more databases that comprise policy information associated with at least one of the first or second ones of the network appliances;

evaluate the policy information in the one or more databases in association with one or more policy parameters;

generate a first instruction command based on at least the policy information, the first instruction command generated in conformance with one of the first or second standard application profiles and configured to instruct the at least one of the first or second ones of the network appliances to perform a specified action; and wirelessly transmit the first instruction command to the at least one of the first or second ones of the network appliances to cause the at least one of the first or second ones of the network appliances to perform the specified action.

8. The processor readable medium of claim 7, wherein the data message from the first or second ones of the network appliances is associated with data obtained from one or more sensors of the first or second ones of the network appliances.

9. The processor readable medium of claim 7, wherein the first instruction command is configured to cause one or more actuators of the first or second ones of the network appliances to operate.

10. The processor readable medium of claim 7, wherein the first or second data message includes sensor data, the policy information includes one or more triggering operating parameters with respect to the sensor data, and the processor executable code when executed by the processor further causes the processor to:

communicate data to one or more server devices, wherein the communication data is processed by the one or more server devices.

11. The processor readable medium of claim 7, wherein the processor executable code when executed by the processor further causes the processor to:

generate a plurality of proposed operation schedules, each proposed operation schedule designating selected operation times for a plurality of selected ones of the network appliances over a designated time duration;

analyze the plurality of generated proposed schedules in association with one or more set operating constraints; and identify an optimized schedule from the proposed operation schedules, the optimized schedule having a lowest utility cost for operating the selected ones of the network appliances and satisfying the one or more set operating constraints.

12. The processor readable medium of claim 11, wherein the processor executable code when executed by the processor further causes the processor to:

generate preselected probability indexes for each of the selected ones of the network appliances for each time increment in the time duration, the probability indexes representative of a likelihood that the selected ones of the network appliances would be operational in each time increment in the time duration and corresponding to a priority of operation of the selected ones of the network appliances; and apply the probability indexes in generating each of the proposed operating schedules.

13. A gateway computing device comprising:

a network interface capable of communicating with a plurality of network appliances in a closed area network;

a memory comprising programmed instructions; and a processor configured to execute the stored programmed instructions in the memory to:

wirelessly receive first and second data messages from first and second ones of the network appliances, respectively, in the closed area network;

analyze the received first and second data messages to determine first and second standard application profiles and retrieve the first and second standard application profiles from a locally stored application profile database, wherein the first standard application profile is not the same as the second standard application profile;

access one or more databases that comprise policy information associated with at least one of the first or second ones of the network appliances;

evaluate the policy information in the one or more databases in association with one or more policy parameters;

generate a first instruction command based on at least the policy information, the first instruction command generated in conformance with one of the first or second standard application profiles and configured to instruct the at least one of the first or second ones of the network appliances to perform a specified action; and wirelessly transmit the first instruction command to the at least one of the first or second ones of the network appliances to cause the at least one of the first or second ones of the network appliances to perform the specified action.

14. The computing device of claim 13, wherein the data message from the first or second ones of the network appliances is associated with data obtained from one or more sensors of the first or second ones of the network appliances.

15. The computing device of claim 13, wherein the first instruction command is configured to cause one or more actuators of the first or second ones of the network appliances to operate.

16. The computing device of claim 13, wherein the first or second data message includes sensor data, the policy information includes one or more triggering operating parameters with respect to the sensor data, and the processor is further configured to execute the programmed instructions stored in the memory to:

communicate data to one or more server devices, wherein the communication data is processed by the one or more server devices.

17. The computing device of claim 13, wherein the processor is further configured to execute the programmed instructions stored in the memory to:

generate a plurality of proposed operation schedules, each proposed operation schedule designating selected operation times for a plurality of selected ones of the network appliances over a designated time duration;

analyze the plurality of generated proposed schedules in association with one or more set operating constraints; and identify an optimized schedule from the proposed operation schedules, the optimized schedule having a lowest utility cost for operating the selected ones of the network appliances and satisfying the one or more set operating constraints.

18. The computing device of claim 17, wherein the processor is further configured to execute the programmed instructions stored in the memory to:

generate preselected probability indexes for each of the selected ones of the network appliances for each time increment in the time duration, the probability indexes representative of a likelihood that the selected ones of the network appliances would be operational in each time increment in the time duration and corresponding to a priority of operation of the selected ones of the network appliances; and apply the probability indexes in generating each of the proposed operating schedules.

* * * * *